(12) United States Patent
Yang et al.

(10) Patent No.: US 10,328,879 B2
(45) Date of Patent: Jun. 25, 2019

(54) BUMPER BEAN DESIGN FOR CRASH SIGNAL SEPARATION

(71) Applicant: Honda Motor Co., Ltd., Tokyo (JP)

(72) Inventors: Siyang Yang, Powell, OH (US); Lando C. Hamlett, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 15/638,681

(22) Filed: Jun. 30, 2017

(65) Prior Publication Data
US 2019/0001909 A1    Jan. 3, 2019

(51) Int. Cl.
*B60R 19/34* (2006.01)
*B60R 19/48* (2006.01)
(Continued)

(52) U.S. Cl.
CPC ........ *B60R 21/0136* (2013.01); *B60R 19/483* (2013.01); *B60R 21/0132* (2013.01); *B60R 19/34* (2013.01); *B60R 21/013* (2013.01); *B60R 2021/0004* (2013.01); *B60R 2021/0023* (2013.01); *B60R 2021/01013* (2013.01); *B60R 2021/01211* (2013.01); *B60R 2021/01231* (2013.01)

(58) Field of Classification Search
CPC .......... B60R 19/483; B60R 2021/0004; B60R 2021/0009; B60R 2021/0023; B60R 2021/01211; B60R 2021/01231; B60R 2021/01322; B60R 21/0132; B60R 21/0133; B60R 21/01332; B60R 21/0136; B60R 19/34; B60R 2021/01013; B60R 21/013
See application file for complete search history.

(56) References Cited

U.S. PATENT DOCUMENTS 5,584,518 A * 12/1996 Frank ................ B60R 19/24
293/102
5,803,517 A * 9/1998 Shibuya .............. B60R 19/18
293/120
(Continued)

FOREIGN PATENT DOCUMENTS

CN    102770309    11/2012
CN    102971185    3/2013
(Continued)

*Primary Examiner* — Laura Freedman
(74) *Attorney, Agent, or Firm* — Rankin, Hill & Clark LLP (57) ABSTRACT

A system for airbag deployment within a vehicle may include an airbag, a bumper beam, at least one sensor, and an electronic control unit (ECU). The bumper beam may include a left crush can and a right crush can. The left crush can and the right crush can may each include a first zone associated with a first stiffness in a vehicle longitudinal direction and a second zone associated with a second stiffness in the vehicle longitudinal direction. The sensor may receive one or more signals associated with an impact on the vehicle. The ECU may deploy the airbag at a timing based on one or more characteristics of one or more of the signals and one or more predetermined characteristics associated with the first stiffness of the first zone and the second stiffness of the second zone, thereby providing robust discrimination between a front flat impact mode and an front offset impact mode.

20 Claims, 10 Drawing Sheets

(51) Int. Cl.
   *B60R 21/013* (2006.01)
   *B60R 21/0132* (2006.01)
   *B60R 21/0136* (2006.01)
   *B60R 21/01* (2006.01)
   *B60R 21/00* (2006.01)

(56) References Cited

U.S. PATENT DOCUMENTS

| | | | |
|---|---|---|---|
| 6,135,251 A | 10/2000 | Hartlieb et al. | |
| 6,559,763 B2 * | 5/2003 | Murphy | B60R 21/0136 340/436 |
| 7,025,410 B2 * | 4/2006 | Kosaka | B62D 21/152 296/187.09 |
| 7,031,815 B2 * | 4/2006 | Imai | B60R 21/0132 180/282 |
| 7,073,831 B2 | 7/2006 | Evans | |
| 7,086,690 B2 * | 8/2006 | Shuler | B60R 19/12 293/132 |
| 7,304,566 B2 * | 12/2007 | Mae | B60R 21/0136 280/734 |
| 7,347,464 B2 * | 3/2008 | Tanabe | B60R 19/483 180/274 |
| 7,416,231 B2 * | 8/2008 | Takahashi | B60R 21/0136 180/274 |
| 7,677,617 B2 | 3/2010 | Stewart et al. | |
| 7,952,469 B2 * | 5/2011 | Suzuki | B60R 21/0136 340/435 |
| 8,056,926 B2 * | 11/2011 | Okabe | B60R 19/34 180/311 |
| 8,368,523 B2 * | 2/2013 | Takahashi | B60R 21/0136 180/274 |
| 8,649,937 B2 | 2/2014 | Freienstein et al. | |
| 8,662,546 B2 | 3/2014 | Kizaki et al. | |
| 8,973,957 B2 | 3/2015 | Corwin et al. | |
| 9,174,595 B2 * | 11/2015 | Ghannam | B60R 19/20 |
| 2005/0104392 A1 * | 5/2005 | Liebhard | B60R 19/18 293/132 |
| 2006/0185923 A1 * | 8/2006 | Tanabe | B60R 21/0136 180/274 |
| 2006/0231321 A1 * | 10/2006 | Takahashi | B60R 21/0136 180/274 |
| 2012/0221211 A1 * | 8/2012 | Lich | B60R 21/0136 701/46 |
| 2012/0319413 A1 | 12/2012 | Andres et al. | |
| 2013/0048455 A1 | 2/2013 | Friedrich et al. | |
| 2013/0207408 A1 | 8/2013 | Friedrich et al. | |
| 2015/0375701 A1 | 12/2015 | Röttger et al. | |
| 2017/0240128 A1 * | 8/2017 | Kashiwagi | B60R 11/00 |

FOREIGN PATENT DOCUMENTS

| | | |
|---|---|---|
| DE | 19633110 | 2/1997 |
| DE | 19814842 | 10/1999 |
| DE | 102010001990 | 8/2011 |
| DE | 102010018316 | 9/2011 |
| DE | 102013203481 | 9/2014 |
| DE | 102014101614 | 5/2015 |

* cited by examiner

BUMPER BEAN DESIGN FOR CRASH SIGNAL SEPARATION

BACKGROUND

Front bumper beams are often a first point of contact between a vehicle's structure and an object in a crash. Different types of crashes may occur with different types of objects. For example, a vehicle may collide with an object such as a tree or a utility pole. As another example, the vehicle may collide with an object such as a wall or a concrete barrier.

BRIEF DESCRIPTION

According to one or more aspects, a system for airbag deployment within a vehicle may include an airbag, a bumper beam, at least one sensor, and an electronic control unit (ECU). The bumper beam includes a left crush can arranged on a left side of the bumper beam and a right crush can arranged on a right side of the bumper beam. The left crush can and the right crush can each include a first zone associated with a first stiffness in a vehicle longitudinal direction and a second zone associated with a second stiffness in the vehicle longitudinal direction. The at least one sensor receives one or more signals associated with an impact on the vehicle. The ECU deploys the airbag at a timing based on one or more characteristics of one or more of the signals and one or more predetermined characteristics associated with the first stiffness of the first zone and the second stiffness of the second zone. One or more of the characteristics and predetermined characteristics is an amplitude or a wavelength of one or more of the signals.

The second stiffness of the second zone may be greater than the first stiffness of the first zone. The left crush can and the right crush can may be arranged with the first zone outward of the second zone in a vehicle widthwise direction. An inboard wall defining the second zone may have a greater thickness than a thickness of an outboard wall defining the first zone. A width of the first zone in a vehicle widthwise direction may be based on a layout of a barrier of a small overlap barrier test. A length of an inboard wall defining the second zone in the vehicle longitudinal direction may be greater than a length of an outboard wall defining the first zone in the vehicle longitudinal direction. A forward end of an inboard wall defining the left crush can or the right crush can may be spaced a predetermined distance to a forward most face of the bumper beam in the vehicle longitudinal direction to control a desired deployment time of the airbag from a time of impact for front flat mode. One or more of the signals may be indicative of an acceleration of the vehicle. The ECU may deploy the airbag at a first time based on the amplitude of one or more of the signals being greater than an amplitude threshold or based on the wavelength of one or more of the signals being greater than a wavelength threshold.

According to one or more aspects, a system for airbag deployment within a vehicle may include an airbag, a bumper beam, at least one sensor, and an electronic control unit (ECU). The bumper beam includes a left crush can and a right crush can. Each crush can includes a first zone associated with a first stiffness in a vehicle longitudinal direction and a second zone associated with a second stiffness in the vehicle longitudinal direction. The at least one sensor may receive one or more signals associated with an impact on the vehicle. The ECU may deploy the airbag based on an amplitude or a wavelength of one or more of the signals compared to an amplitude threshold or a wavelength threshold associated with the first stiffness of the first zone and the second stiffness of the second zone.

The second stiffness of the second zone may be greater than the first stiffness of the first zone. The left crush can and the right crush can may be arranged with the first zone outward of the second zone in a vehicle widthwise direction. An inboard wall defining the second zone may have a greater thickness than a thickness of an outboard wall defining the first zone. A width of the first zone in a vehicle widthwise direction may be based on a layout of a barrier of a small overlap barrier test. A length of an inboard wall defining the second zone in the vehicle longitudinal direction may be greater than a length of an outboard wall defining the first zone in the vehicle longitudinal direction. A forward end of an inboard wall defining the left crush can or the right crush can may be spaced a predetermined distance to a forward most face of the bumper beam in the vehicle longitudinal direction to control a desired deployment time of the airbag from a time of impact. The at least one sensor may be an accelerometer and one or more of the signals may be indicative of an acceleration of the vehicle. The at least one sensor may include a front crash sensor (FCS) and an accelerometer, and the ECU may deploy the airbag based on signals from both the FCS and the accelerometer exceeding the amplitude threshold or the wavelength threshold.

According to one or more aspects, a system for airbag deployment within a vehicle may include an airbag, a bumper beam, an accelerometer, and an electronic control unit (ECU). The bumper beam may include a left crush can and a right crush can. Each crush can may include a first zone associated with a first stiffness in a vehicle longitudinal direction and a second zone associated with a second stiffness in the vehicle longitudinal direction, the second zone arranged inboard of the first zone. The second stiffness of the second zone may be greater than the first stiffness of the first zone. The accelerometer may receive one or more signals associated with an impact on the vehicle. The ECU may deploy the airbag based on an amplitude or a wavelength of one or more of the signals compared to an amplitude threshold or a wavelength threshold associated with the first stiffness of the first zone and the second stiffness of the second zone.

DETAILED DESCRIPTION

Figure 1A:
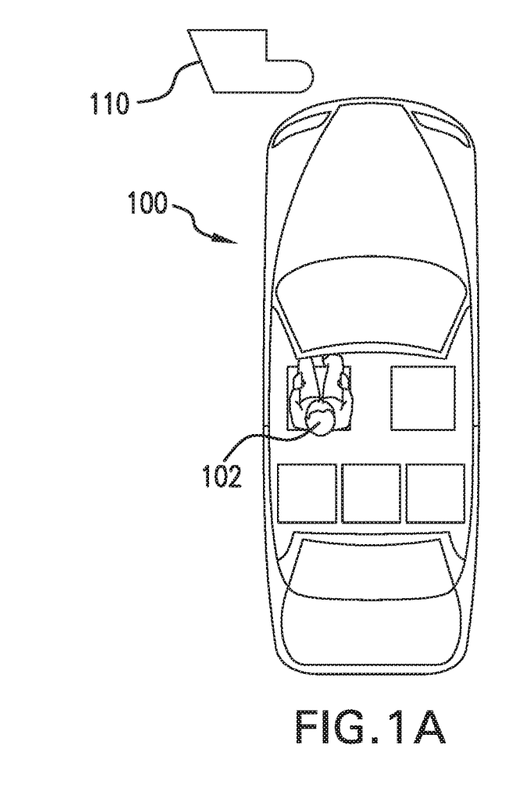
FIGS. 1A and 1B are illustrations of impact scenarios for a vehicle.
Figure 1B:
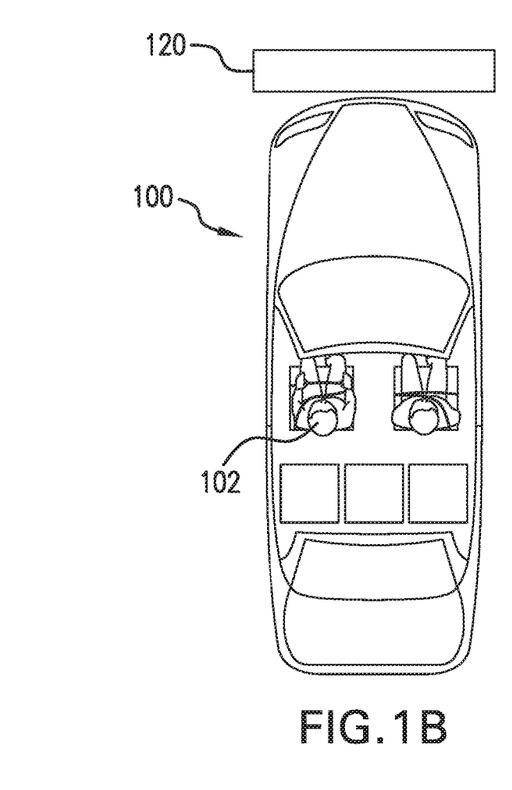

FIGS. 1A and 1B are illustrations of different impact scenarios for a vehicle 100, wherein different types of testing are performed to assess or rate vehicle safety. In FIG. 1A, the vehicle 100 is colliding with an object 110 which is offset from the center of the vehicle and is representative of a small overlap type frontal impact (e.g., the Insurance Institute for Highway Safety (IIHS) small overlap barrier test). In the IIHS small overlap barrier test, the object 110 has ~25% overlap with respect to a vehicle width of the vehicle 100. Characteristics often associated with an impact event of FIG. 1A include a long duration of impact mode, a high level of cabin intrusion, slower vehicle deceleration, etc. In FIG. 1B, the vehicle 100 is colliding with an object 120 which is center to the vehicle and is representative of a frontal collision or frontal flat type impact. Characteristics often associated with an impact event of FIG. 1B include a shorter duration of impact mode and a higher level of vehicle deceleration. In the National Highway Traffic Safety Administration's (NHTSA) New Car Assessment Program (NCAP), a frontal collision is with the object 120, a barrier which overlaps 100% of the vehicle width. As such, when the impact event is with the object 120 of FIG. 1B, the vehicle 100 undergoes a more severe deceleration, causing an occupant 102 of the vehicle to move towards a steering wheel of the vehicle quicker or earlier than in the impact scenario of FIG. 1A.

Figure 1C:
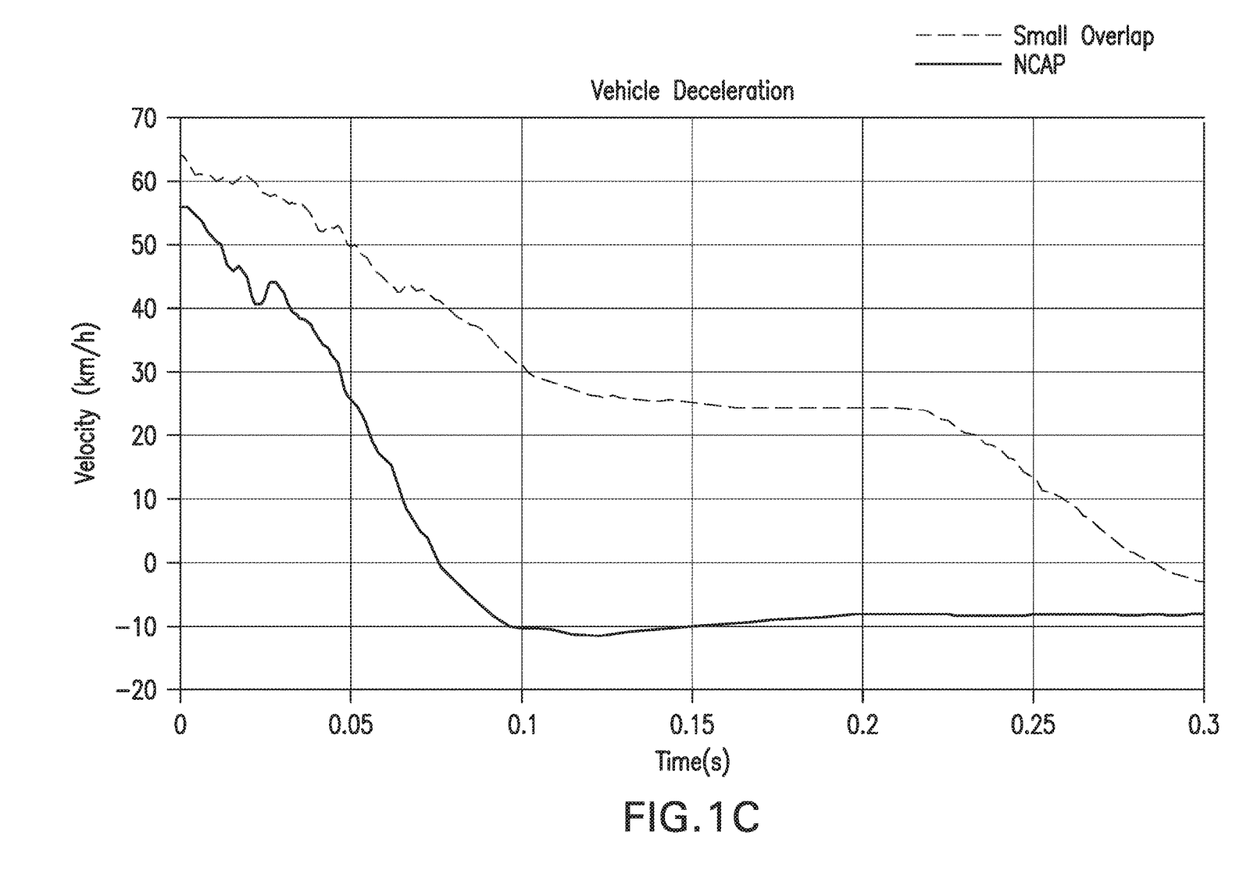
FIG. 1C is an illustration of an exemplary graph illustrating impact characteristics or signatures of the impact scenarios of FIGS. 1A-1B.

With reference to FIG. 1C, the slopes of the velocity curves show that the NCAP is a more severe test mode in terms of deceleration because the velocity of the NCAP vehicle drops at a greater rate than the velocity of the small overlap vehicle. As such, the greater amount of deceleration that occurs in the NCAP impact mode associated with FIG. 1A results in the occupant of the vehicle to move towards the steering wheel quicker or earlier than the small overlap impact mode associated with FIG. 1B.

Both impact modes or impact events of FIGS. 1A-1B are associated with a high initial force input into a bumper beam of the vehicle 100. However, in the frontal impact scenario of FIG. 1B, deceleration for the occupant 102 of the vehicle 100 is sustained, causing the occupant 102 to move towards the steering wheel of the vehicle early in the impact event. The small overlap type frontal impact event of FIG. 1A, on the other hand, is a longer type impact event, and deceleration is generally not sustained after an initial impact with the object 110. This causes the occupant 102 to move towards the steering wheel later during the impact event. Therefore, it is desirable to deploy the airbag at different timings for the impact scenarios of FIGS. 1A and 1B.

Figure 2:
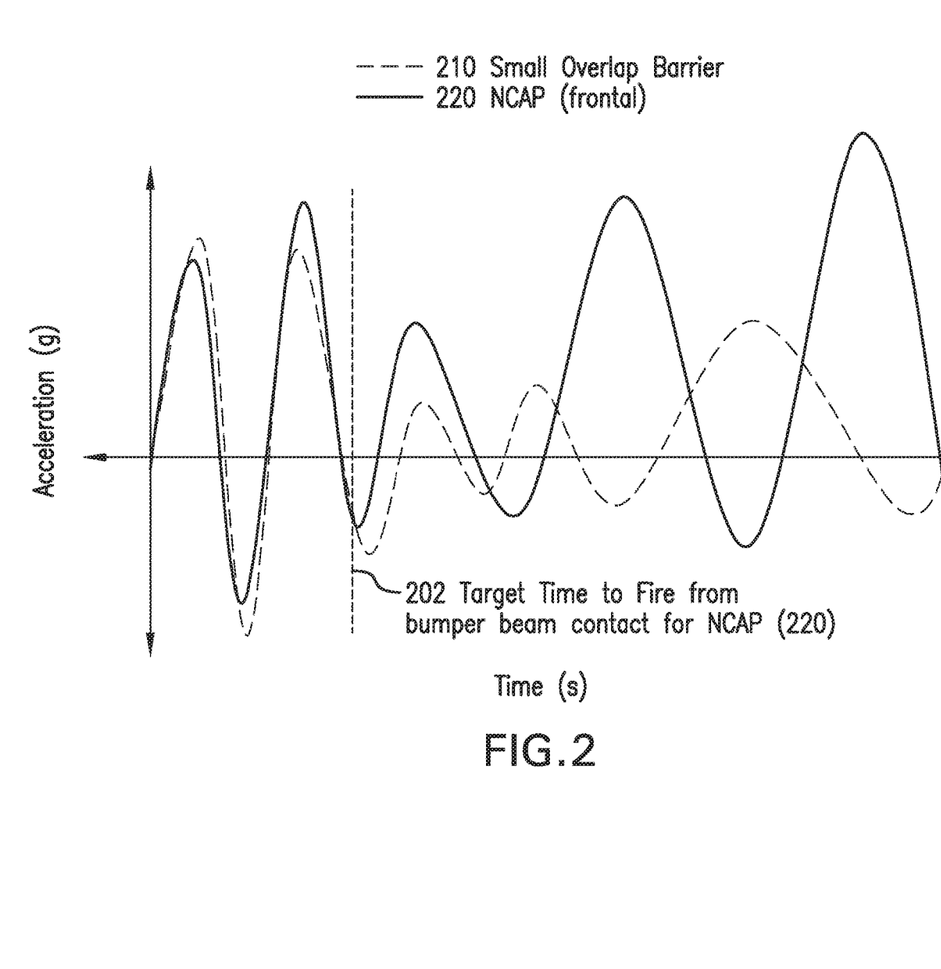
FIG. 2 is an illustration of an exemplary graph illustrating impact characteristics or signatures of the impact scenarios of FIGS. 1A-1B.

FIG. 2 is an illustration of an exemplary graph illustrating impact characteristics or signatures of the impact scenarios of FIGS. 1A-1B of the vehicle which is not equipped with a system for airbag deployment for the vehicle described herein. FIG. 2 is a graphical illustration of acceleration versus time for two different impact scenarios, a small overlap barrier impact event 210 and a frontal impact event 220. As depicted, there is little differentiation between the signature of the small overlap barrier impact event 210 and the signature of the frontal impact event 220 signals prior to a target time to fire at 202. As such, a vehicle which is not equipped with the system for airbag deployment for the vehicle described herein may not be capable of distinguishing between different types of impacts prior to the target time to fire.

Figure 3A:
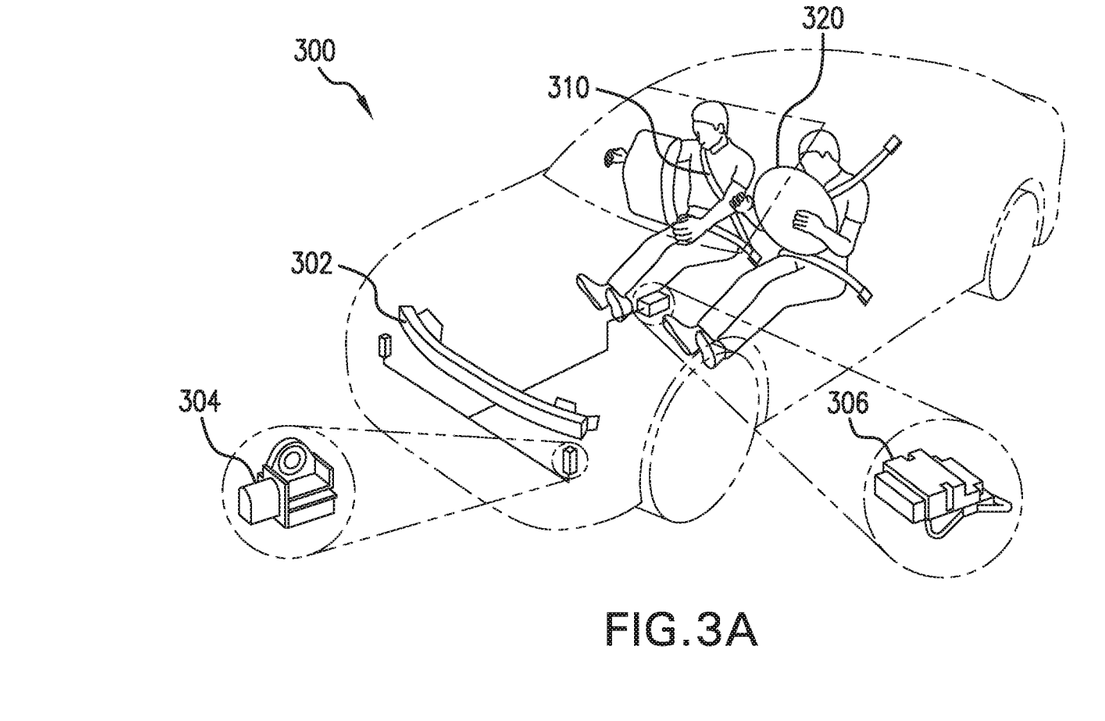
FIG. 3A is a schematic illustration of an exemplary system for airbag or safety mechanism deployment for a vehicle, according to one or more embodiments.

FIG. 3A is a schematic illustration of an exemplary system 300 for airbag or safety mechanism deployment for the vehicle, according to one or more embodiments. The system may include a bumper beam 302, a front crash sensor (FCS) 304, an electronic control unit (ECU) 306, a seatbelt 310, and an airbag 320.

In one or more embodiments, the ECU 306 may include one or more built-in sensors, such as an accelerometer, which may detect signals (e.g., acceleration signals) associated with the crash or impact event. The accelerometer may be capable of measuring acceleration signals in the x, y, and/or z directions (e.g., global acceleration). Upon frontal impact with an object, at least one of the sensors 304 or 306 may detect the impact or the impact event and associated signals or data from the impact.

The ECU 306 may control deployment of the airbag 320, the seatbelt 310, and other safety features. For example, when one or more of the signals exceeds a threshold, such as an acceleration threshold, an amplitude threshold, or a wavelength threshold, the ECU 306 may deploy or fire the airbag 320. In one or more embodiments, the ECU 306 controls deployment of the airbag 320 based on one or more signals from the front crash sensor 304 and one or more signals from the sensors of the ECU 306. In other words, the ECU 306 may deploy or fire the airbag 320 based on signals from the front crash sensor 304 indicating the impact (e.g., signal measurements exceeding a FCS acceleration threshold) and signals from the sensors of the ECU 306 indicating the impact (e.g., signal measurements exceeding another threshold or acceleration threshold), thereby mitigating misdetection or misfires of the airbag 320. Further, the ECU 306 may apply one or more filters or calibration maps (discussed below, in FIG. 7) to one or more of the signals from at least one of the sensors 304 or 306.

Although FIG. 3A merely illustrates a single, driver-side airbag, embodiments including multiple airbags (e.g., a second airbag, a passenger-side airbag, etc.) are contemplated. In other words, the ECU 306 may control deployment of multiple airbags including a second airbag, a third airbag, etc. Further, although the system 300 of FIG. 3A is described with respect to airbag deployment, the system 300 may control deployment or firing of other safety features or safety mechanisms, such as seatbelts using signals from at least one of the sensors 304 or 306 and/or based on the bumper beam design disclosed herein. Further, the system 300 may control safety feature deployment for the driver or passengers (e.g., front and rear) of the vehicle. Passenger-side, second, or other airbags may be deployed by the ECU 306 at a different timing than the airbag 320, such as during the small overlap type frontal impact event of FIG. 1A.

The airbag 320 of the system 300 of FIG. 3A may be designed to vent to release pressure after deployment. The venting reduces injuries from impact of the occupant with the airbag 320 by absorbing kinetic energy of the occupant.

However, it may be desirable to time the deployment of the airbag 320 to adjust the stiffness felt by the occupant. For example, when the airbag 320 is first deployed, it is generally stiffer. As the airbag 320 vents, the stiffness of the airbag 320 decreases. Therefore, the ECU 306 may adjust a timing for the deployment of the airbag 320 according to data or signals received from at least one of the sensors 304 or 306 and the design of the bumper beam, which is discussed in greater detail below.

Figure 3B:
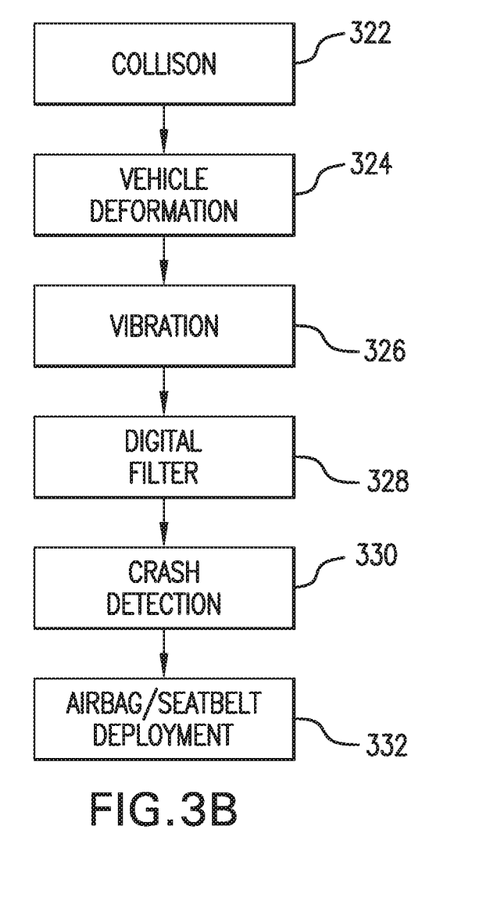
FIG. 3B is an illustration of an exemplary flow diagram of a method for airbag or safety mechanism deployment for a vehicle, according to one or more embodiments.

FIG. 3B is an illustration of an exemplary flow diagram of the method for airbag deployment for the vehicle, according to one or more embodiments. At 322, the collision occurs, and the vehicle collides with the object. At 324, at least partial deformation of the vehicle occurs, including bumper beam deformation, crush can deformation, etc. The deformation at 322 may be associated with vibration 326 or other signals, which are received, sensed, or detected by sensors 304 or 306. At 328, one or more of the detected signals are filtered. At 330, the ECU 306 may make a determination as to a type of impact which has occurred. At 332, the airbag 320 may be deployed accordingly.

Figure 4:
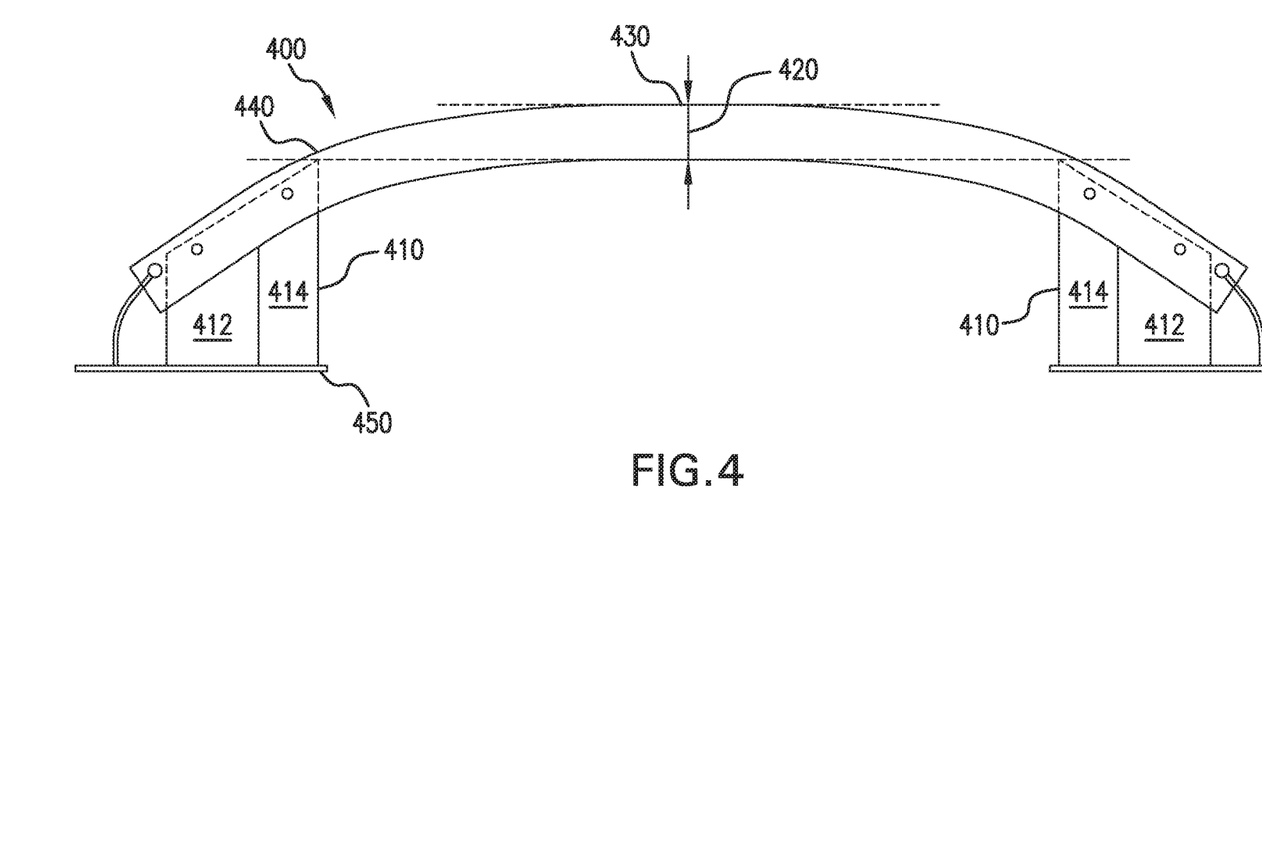
FIG. 4 is an illustration of an exemplary bumper beam for the system of FIG. 3A, according to one or more embodiments.

FIG. 4 is an illustration of an exemplary bumper beam 400 for the system 300 of FIG. 3A, according to one or more embodiments. The bumper beam 400 may include crush cans 410 arranged at opposite end portions of the bumper beam 400 (e.g., left and right crush cans) each crush can 410 is configured to include a first zone 412 and a second zone 414. The crush cans 410 are arranged such that the first zone 412 is outward of the second zone 414 in a vehicle widthwise direction. In other words, the first zones 412 of the crush cans 410 are arranged outboard of the second zones 414 for each of the crush cans 410.

In one or more embodiments, a longitudinal distance 420 between a central, forwardly located, portion of the bumper beam 400 (i.e., a forward most face 430 of the bumper beam) and a forward most portion of the crush cans 410 may be minimized or sized based on the target time to fire. According to one aspect, this distance 420 may be between 70-80 millimeters, for example, approximately less than or equal to seventy-five millimeters, thereby facilitating early detection or identification of the frontal flat type impact event which produces severe deceleration (e.g., similar to the impact event of FIG. 1B).

Explained another way, it may be desirable to have the ECU 306 deploy the airbag 320 prior to the target time to fire (approximately 15 milliseconds after contact of the bumper beam 400 with the object during the impact event). As such, a deployment time for the airbag 320 may be dependent on:
  a time associated with at least partial deformation of the forward most face 430 of the bumper beam 400 relative to a forward end 440 of an inboard wall 604 of the left or the right crush can,
  a time associated with at least partial deformation of a portion of the bumper beam 400 from the forward end 440 of the inboard wall 604 of the left or the right crush can to a rear end 450 of the left or right crush can,
  a time associated with sensing one or more signals associated with the impact, and
  a time between initiating airbag deployment and the airbag 320 becoming fully deployed.

Thus, in designing the bumper beam 400 with the front flat impact mode in mind, the forward end 440 of the inboard wall of the left crush can or the right crush can is spaced the predetermined distance 420 to the forward most face 430 of the bumper beam 400 in a vehicle longitudinal direction to control a desired deployment time (e.g., prior to the target time to fire) of the airbag 320 from a time of impact. By setting the distance 420 between the forward most face 430 of the bumper beam 400 and the forward end 440 of the inboard wall of the left crush can or the right crush can based on the desired deployment time, the ECU 306 may control a timing of deployment of the airbag 320 in a more precise manner.

In one or more embodiments, the longitudinal stiffness of each crush can 410 is not uniform across the width of the crush can 410 and is stiffer on an inboard side compared to an outboard side of each crush can 410. This difference in stiffness may promote signal separation between different types of impact scenarios or impact types, thereby enabling the ECU 306 to differentiate or distinguish between frontal flat type impacts and small overlap type frontal impacts. In other words, due to the differing stiffness of the first zone 412 and the second zone 414, the signals received from the different impact scenarios (e.g., FIGS. 1A and 1B) will have greater signal separation in that features, characteristics, or signatures associated with these signals may present differently at earlier times, thereby enabling the ECU 306 to deploy the airbag 320 or safety features accordingly. According to the present disclosure, the second zone 414 is associated with a second stiffness which is greater than a first stiffness of the first zone 412, the frontal impact, such as the impact scenario of FIG. 1B, results in a detected acceleration signal having a greater amplitude and/or greater wavelength or period than other types of impacts, such as the impact scenario of FIG. 1A, thereby enabling the ECU 306 to perform impact type detection based on the characteristics of one or more of the signals.

Figure 5:
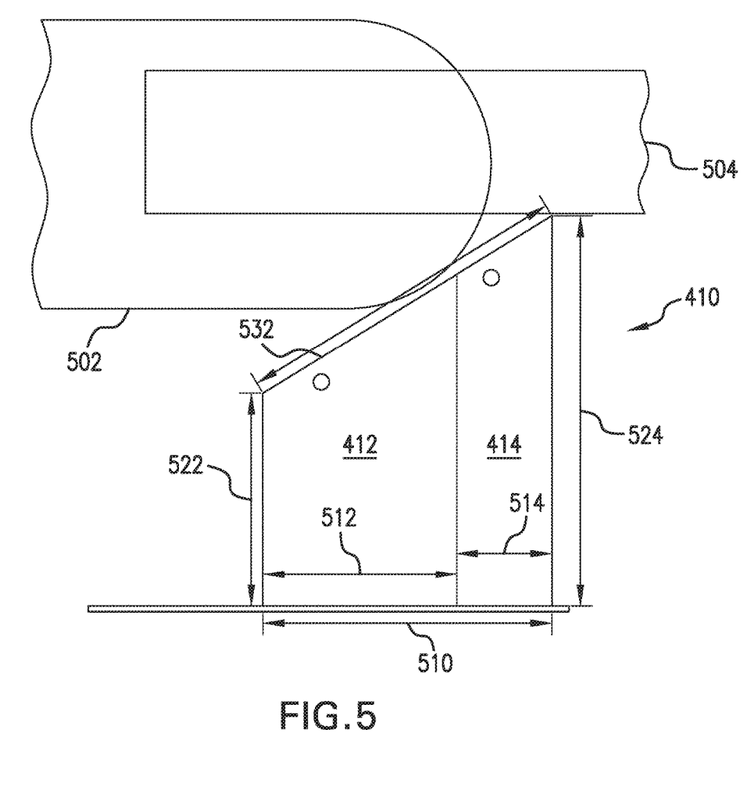
FIG. 5 is an illustration of a top-down view of an exemplary crush can for the bumper beam, according to one or more embodiments.

FIG. 5 is an illustration of a top-down view of the exemplary crush can 410 (particularly the left crush can) for the bumper beam 400, according to one or more embodiments. The first and second zone 412, 414 of the crush can 410 may be designed to differentiate between different types of impact events, such as the frontal flat type impact associated with an object 504 or the small overlap type frontal impact associated with an object 502. As previously discussed, the first zone 412 may be associated with the first stiffness and the second zone 414 may be associated with the second stiffness, which is greater than the first stiffness.

The first zone 412 and the second zone 414 of the exemplary crush can 410 may be configured with one or more dimensions in mind. An overall width 510 of the crush can 410 may be separated between a first width 512 associated with the first zone 412 and a second width 514 associated with the second zone 414. An outboard wall defining the first zone 412 has a length 522 and an inboard wall defining the second zone 414 has a length 524. A frontal end 532 of the crush can 410 absorbs the impact from objects 502, 504. To ensure that the deformation of the second zone 414 occurs prior to the deformation of the first zone 412 during the frontal flat type impact, the length 524 of the inboard wall defining the second zone 414 is greater than the length 522 of the outboard wall defining the first zone 412 in the vehicle longitudinal direction.

Figure 8A:
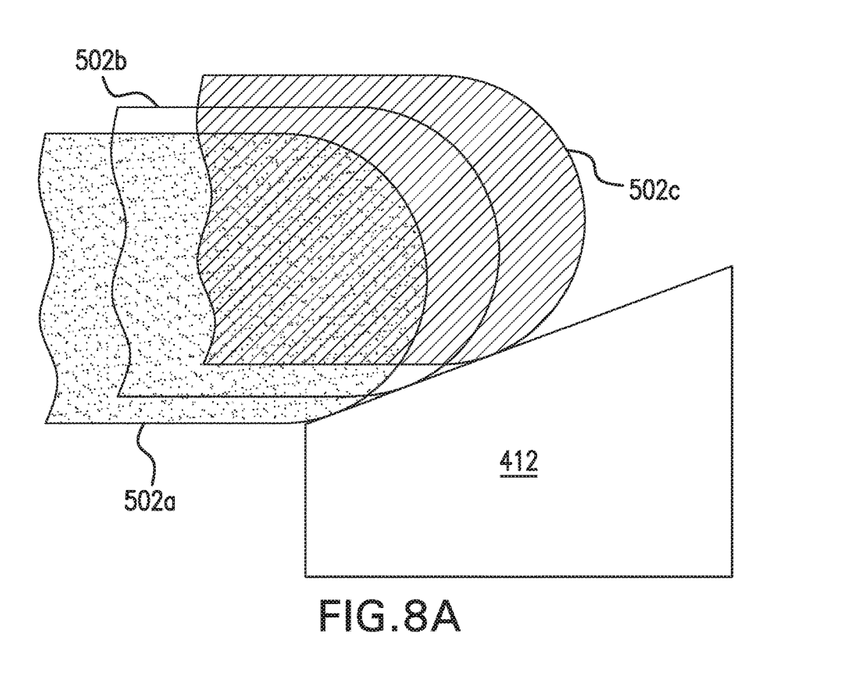
FIG. 8A is an illustration of the exemplary crush can impacted at various points along its width, according to one or more embodiments.
Figure 8B:
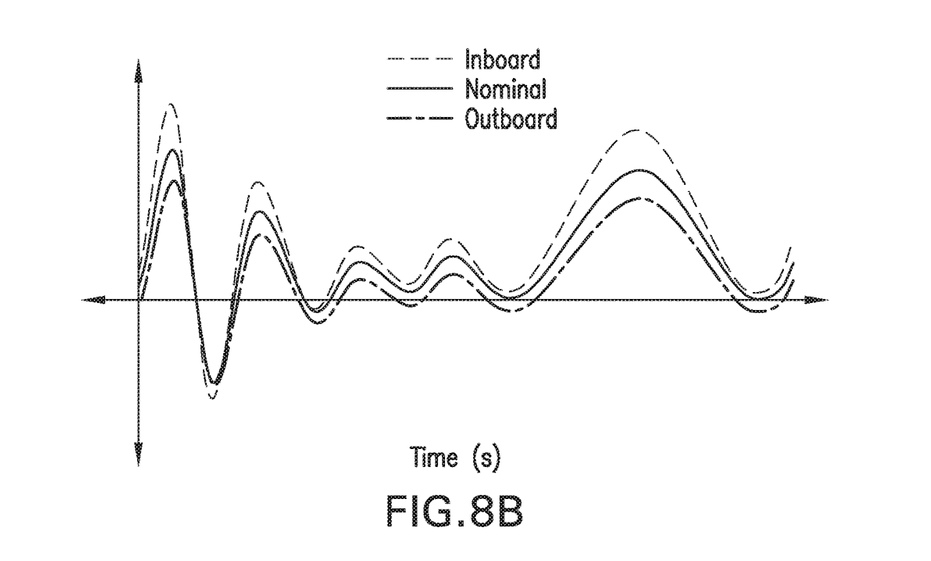
FIG. 8B is an illustration of an exemplary graph illustrating impact characteristics or signatures of the impact scenarios of FIG. 8A when a system for airbag or safety mechanism deployment for a vehicle is implemented.

Further, the second width 514 of the second zone 414 may be set based on the first width 512 of the first zone 412 or the overall width 510 of the crush can. For example, the second width 514 of the second zone 414 in the vehicle widthwise direction may be less than half the first width 512 of the first zone 412 in the vehicle widthwise direction, thereby enabling the crush can 410 to absorb the impact from the object 502 in a more consistent fashion and enabling the sensors 304 or 306 to produce signals with less variation, as will be described with reference to FIGS.

8A-8B. In other embodiments, the first width 512 of the first zone 412 may be set based on a layout of a barrier of a small overlap barrier test.

As previously discussed, the ECU 306 may control deployment of the airbag 320 at a timing based on one or more characteristics of one or more of the signals and one or more predetermined characteristics associated with the first stiffness of the first zone 412 and the second stiffness of the second zone 414. These predetermined characteristics will be described in greater detail in FIG. 7.

Figure 6:
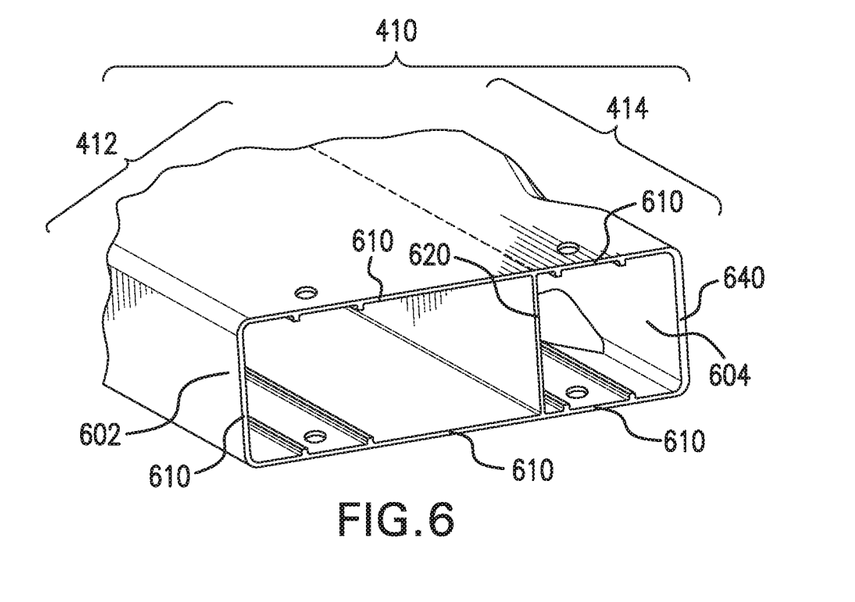
FIG. 6 is an illustration of a cross-sectional view of the exemplary crush can, according to one or more embodiments.

FIG. 6 is an illustration of a cross-sectional view of an exemplary crush can 410, according to one or more embodiments. An outer wall or outboard wall defining the first zone 412 is shown at 602 and an inner wall or inboard wall defining the second zone 414 is shown at 604. The outer wall 602 has a first thickness 610 and the inner wall 604 has a second thickness 640. In the depicted aspect, the inner wall 604 of the second zone 414 of the crush can 410 has a greater thickness 640 than the outer wall 602 of the first zone 412 of the crush can 410 and a greater thickness than a wall 620. Providing the inner wall 604 with the increased thickness 640 enables the second zone 414 to have the second stiffness in the vehicle longitudinal direction which is greater than the first stiffness of the first zone 412.

As the result of the outer wall or outboard wall 602 being thinner than the inboard or inner wall 604, impacts associated with the object 502 of FIG. 5 result in signals (e.g., acceleration signals from at least one of the sensors 304 or 306) associated with a lower amplitude than signals associated with impacts from the object 504 of FIG. 5. This signal separation may be seen in FIG. 7.

Figure 7:
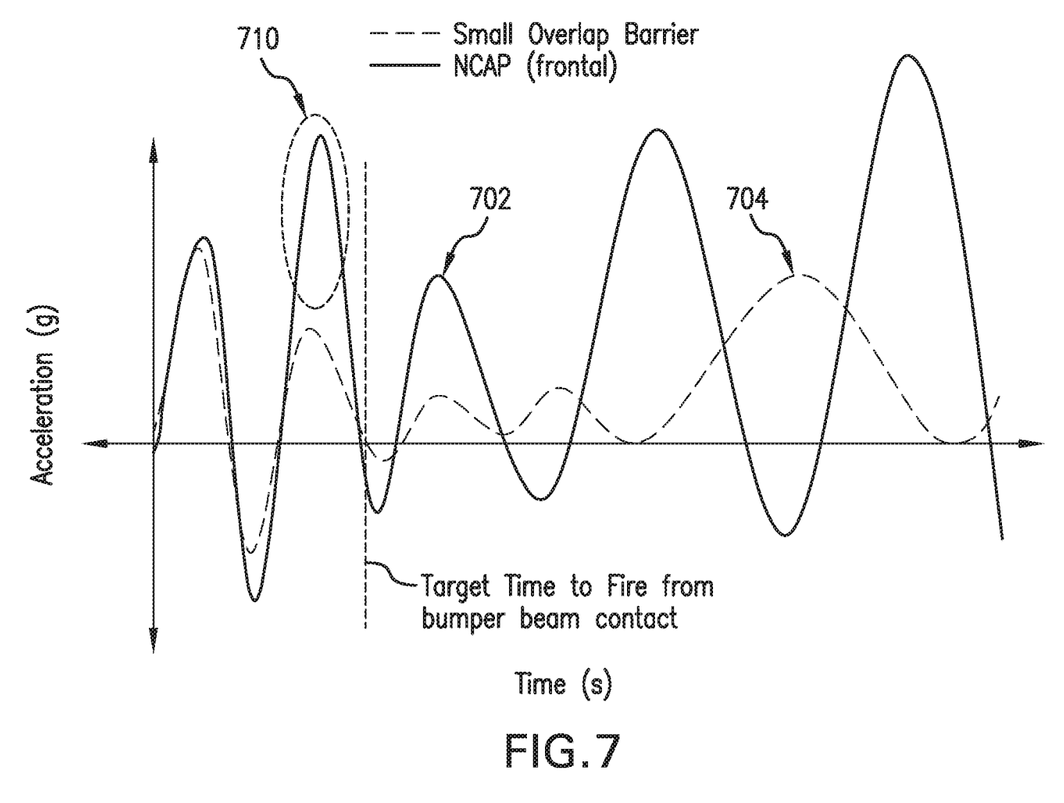
FIG. 7 is an illustration of an exemplary graph illustrating impact characteristics or signatures of the impact scenarios of FIGS. 1A-1B when a system for airbag or safety mechanism deployment for a vehicle is implemented.

FIG. 7 is an illustration of an exemplary graph illustrating impact characteristics or signatures of the impact scenarios of FIGS. 1A-1B when the system 300 for airbag deployment for the vehicle is implemented, such as by implementing the exemplary bumper beam 400 with the crush can 410 of FIG. 5.

In one or more embodiments, the system 300 may provide impact signal separation during the impact or collision event earlier than other systems with other bumper beam and crush can designs. For example, in FIG. 2 (which does not implement the exemplary system 300 for safety feature deployment), the ECU 306 may not necessarily be able to distinguish different types of impact events prior to the target time to fire at 202. Conversely, in FIG. 7, when the exemplary system 300 for airbag deployment for the vehicle is implemented, the ECU 306 may determine a type of impact on the vehicle at a time prior to the target time to fire, such as at 710, for example. The ECU 306 may deploy the airbag 320 at a timing based on one or more characteristics of one or more of the signals and one or more predetermined characteristics associated with the first stiffness of the first zone 412 and the second stiffness of the second zone 414.

Advantageously, this enables the system 300 to separate small overlap type impact events from frontal flat type impact events within the target time to fire or target time to deploy window. In other words, the system 300 may quickly (e.g., from a time of impact or contact of the object with the bumper beam 400 and prior to exceeding a desired time threshold) and with a high degree of confidence or accuracy, determine the type of impact event associated with the impact, and fire or deploy the airbag 320 at a corresponding timing. For example, with reference to FIG. 1A, because the object 110 is offset to one side, and does not engage and deform the bumper beam 400 evenly or uniformly in the vehicle widthwise direction, the vehicle deceleration is less severe and the occupant deceleration is less severe, it may be desirable to fire or deploy the airbag 320 at the later time (e.g., a second time) than the scenario of FIG. 1B. In FIG. 1B, the object 120 is more wall-like or flat, the impact event is more head-on or frontal, and thus the vehicle deceleration is more severe and the occupant deceleration is more severe, it may be desirable to fire or deploy airbag at an earlier time (e.g., a first time) than the scenario of FIG. 1A.

In any event, because the bumper beam 400 may have the forward end 440 of the inboard wall of the left crush can or the right crush can spaced the predetermined distance 420 from the forward most face 430 of the bumper beam 400 in the vehicle longitudinal direction, because the first zone 412 is associated with the first stiffness in the vehicle longitudinal direction and the second zone 414 is associated with the second stiffness in the vehicle longitudinal direction, and because the crush cans 410 may have their width 512 set relative to respective zones 412, 414, at least one of the sensors 304 or 306 may receive signals which promote impact signal separation at an early time (e.g., prior to the target time to fire).

Thus, the signals received by at least one of the sensors 304 or 306 may include characteristics or signatures which are indicative of the type of impact event (e.g., greater than the amplitude threshold or the wavelength threshold) prior to the target time to fire or deploy threshold or window expiring. Therefore, the ECU 306 may deploy the airbag 320 at an appropriate timing, prior to the target time to fire. The amplitude threshold or wavelength threshold may be set based on signals created by different impact modes associated with the bumper beam 400 and/or crush cans 410. For example, a bumper beam design may result in characteristic signals for each impact mode. Based on these characteristics, the amplitude threshold or the wavelength threshold may be set so that the ECU 306 may compare actual, detected signal characteristics (detected by the vehicle sensors 304 or 306) against predetermined characteristics (e.g., expected or anticipated characteristics based on the bumper beam design) and recognize or identify a current impact mode accordingly. In this way, the ECU 306 may deploy the airbag 320 at the appropriate timing. Further, these amplitude threshold and wavelength thresholds may be adjusted based on calibration maps or software maps.

In other words, characteristic signals associated with different impact modes may be determined based on the distance 420 from the forward end 440 of the inboard wall 604 of the crush can 410 (left or right) to the forward most face 430 of the bumper beam 400 (in the vehicle longitudinal direction), the first stiffness of the first zone 412 of the crush can 410 (in the vehicle longitudinal direction), the second stiffness of the second zone 414 of the crush can 410 (in the vehicle longitudinal direction), and/or the width of the zones 412, 414 relative to the width of the crush can 410 (in the vehicle widthwise direction).

As graphically depicted in FIG. 7, signal 702 represents the frontal flat type impact (e.g., FIG. 1B or object 504), while signal 704 represents the small overlap frontal impact (e.g., FIG. 1A or object 502). Due to the structure and design of the crush cans 410 which were previously described, signal 702 exhibits a greater amount of acceleration than signal 704 during the second period, as seen at 710. Due to this difference in the signal characteristics, the ECU 306 may easily and quickly differentiate different types of impacts, and thus, deploy safety features such as airbags at different timings (e.g., the first time or the second time) based on the detected or sensed signal characteristics (e.g., amplitude, wavelength, etc. of the signal or acceleration signal) and corresponding predetermined characteristics, thereby providing robust discrimination between a front flat impact mode and an front offset impact mode.

The ECU 306 may determine a type of impact based on the amplitude or the wavelength of one or more of the signals and the amplitude threshold or the wavelength threshold. For example, the type of impact may include a frontal flat impact or a small overlap frontal impact. The ECU 306 may utilize one or more calibration maps to identify or associate one or more of the signals with the corresponding impact type. For example, the ECU 306 may determine the type of impact (e.g., frontal flat impact or small overlap frontal impact) based on the amplitude or the wavelength of one or more of the signals and the amplitude threshold or the wavelength threshold in conjunction with one or more calibration maps.

A first calibration map (e.g., a high speed calibration map) may trigger the first timing (e.g., at the earlier time) for airbag deployment while a second calibration map (e.g., the offset impact calibration map) may trigger the second timing (e.g., at the later time) for airbag deployment. Stated another way, the ECU 306 may deploy the airbag 320 at the first time based on the amplitude or wavelength of one or more of the signals being greater than the amplitude threshold or the wavelength threshold. In this way, the system 300 for airbag or safety mechanism deployment for the vehicle may identify and distinguish the INS small overlap type frontal impact or impact signals from the NCAP type frontal flat impact or impact signals early (e.g., prior to the target time to fire threshold) during the impact event.

FIG. 8A is an illustration of the exemplary crush can 410 impacted at various points along its width, according to one or more embodiments. As indicated previously, the width 514 of the second zone 414 of the crush can 410 may be set based on or relative to the overall width of the crush can 410. For example, the width 512 of the first zone 412 of the crush can 410 may be greater than the width 514 of the second zone 414 of the crush can, such as by a factor of two. Setting the width 512 of the first zone 412 wider than the width 514 of the second zone 414 enables the small overlap barrier to impact the first zone 412. This widening may serve to stabilize small overlap type frontal impact signals, received from at least one of the sensors 304 or 306. In other words, setting the width 512 of the first zone 412 relative to the width of the crush can 410 or the width 514 of the second zone 414 (e.g., based on a predetermined ratio) enables stabilization of one or more of the signals for impact scenarios or impacts, such as the small overlap type frontal flat impact of FIG. 1A. Thus, an object associated with a more outboard impact 502a, an object associated with a nominal impact 502b, and an object associated with a more inboard impact 502c, may result in similar signals with similar characteristics, as detected by at least one of the sensors 304 or 306. In one or more embodiments, the width 514 of the second zone 414 of the crush can 410 may be set based on a radius of the barrier of the III-1S small overlap barrier test. For example, the width 512 of the first zone 412 may be set relative to the width 514 of the second zone 414 based on a layout of the barrier of the small overlap barrier test to ensure that the barrier contacts the first, softer zone 412 and not the second, stiffer zone 414 or at an outboard position where crash signal amplitude or signal stability is affected. The reduction in the variation of signals can be seen in FIG. 8B.

FIG. 8B is an illustration of an exemplary graph illustrating impact characteristics or signatures of the impact scenarios of FIG. 8A when the system 300 for airbag or safety mechanism deployment for the vehicle is implemented. As seen in FIG. 8B, signal characteristics for the inboard, nominal, and outboard collisions with objects 502a, 502b, and 502c, respectively, appear similar, differing slightly in magnitude. In this way, the width 512 of the second zone 414 of the crush can 410 may be adjusted to absorb objects from small overlap type frontal impacts in a more uniform fashion.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for airbag deployment within a vehicle, comprising:
   an airbag;
   a bumper beam including:
   a left crush can arranged on a left side of the bumper beam; and
   a right crush can arranged on a right side of the bumper beam,
   wherein the left crush can and the right crush can each include:
   a first zone associated with a first stiffness in a vehicle longitudinal direction; and
   a second zone associated with a second stiffness in the vehicle longitudinal direction,
   wherein the first zone and the second zone are arranged laterally in a vehicle widthwise direction;
   at least one sensor receiving one or more signals associated with an impact on the vehicle; and
   an electronic control unit (ECU) deploying the airbag at a timing based on one or more characteristics of one or more of the signals and one or more predetermined characteristics associated with the first stiffness of the first zone and the second stiffness of the second zone,
   wherein one or more of the characteristics and predetermined characteristics is an amplitude or a wavelength of one or more of the signals.

2. The system of claim 1, wherein the second stiffness of the second zone is greater than the first stiffness of the first zone.

3. The system of claim 1, wherein the left crush can and the right crush can are arranged with the first zone outward of the second zone in the vehicle widthwise direction.

4. The system of claim 1, wherein an inboard wall defining the second zone has a thickness greater than a thickness of an outboard wall defining the first zone.

5. The system of claim 1, wherein a width of the first zone in the vehicle widthwise direction is based on a layout of a barrier of a small overlap barrier test.

6. The system of claim 1, wherein a length of an inboard wall defining the second zone in the vehicle longitudinal direction is greater than a length of an outboard wall defining the first zone in the vehicle longitudinal direction.

7. The system of claim 1, wherein a forward end of an inboard wall defining the left crush can or the right crush can is spaced a predetermined distance to a forward most face of the bumper beam in the vehicle longitudinal direction to control a desired deployment time of the airbag from a time of impact.

8. The system of claim 1, wherein one or more of the signals is indicative of an acceleration of the vehicle.

9. The system of claim 1, wherein the ECU deploys the airbag at a first time based on the amplitude of one or more of the signals being greater than an amplitude threshold.

10. The system of claim 1, wherein the ECU deploys the airbag at a first time based on the wavelength of one or more of the signals being greater than a wavelength threshold.

11. A system for airbag deployment within a vehicle, comprising:
  an airbag;
  a bumper beam including a left crush can and a right crush can which each include:
  a first zone associated with a first stiffness in a vehicle longitudinal direction; and
  a second zone associated with a second stiffness in the vehicle longitudinal direction,
  wherein the first zone and the second zone are arranged laterally in a vehicle widthwise direction;
  at least one sensor receiving one or more signals associated with an impact on the vehicle; and
  an electronic control unit (ECU) deploying the airbag based on an amplitude or a wavelength of one or more of the signals compared to an amplitude threshold or a wavelength threshold associated with the first stiffness of the first zone and the second stiffness of the second zone.

12. The system of claim 11, wherein the second stiffness of the second zone is greater than the first stiffness of the first zone.

13. The system of claim 11, wherein the left crush can and the right crush can are arranged with the first zone outward of the second zone in the vehicle widthwise direction.

14. The system of claim 11, wherein an inboard wall defining the second zone has a thickness greater than a thickness of an outboard wall defining the first zone.

15. The system of claim 11, wherein a width of the first zone in the vehicle widthwise direction is based on a layout of a barrier of a small overlap barrier test.

16. The system of claim 11, wherein a length of an inboard wall defining the second zone in the vehicle longitudinal direction is greater than a length of an outboard wall defining the first zone in the vehicle longitudinal direction.

17. The system of claim 11, wherein a forward end of an inboard wall defining the left crush can or the right crush can is spaced a predetermined distance to a forward most face of the bumper beam in the vehicle longitudinal direction to control a desired deployment time of the airbag from a time of impact.

18. The system of claim 11, wherein the at least one sensor is an accelerometer and one or more of the signals is indicative of an acceleration of the vehicle.

19. The system of claim 11, wherein the at least one sensor includes a front crash sensor (FCS) and an accelerometer, and wherein the ECU deploys the airbag based on signals from both the FCS and the accelerometer exceeding the amplitude threshold or the wavelength threshold.

20. A system for airbag deployment within a vehicle, comprising:
  an airbag;
  a bumper beam including a left crush can and a right crush can which each include:
  a first zone associated with a first stiffness in a vehicle longitudinal direction; and
  a second zone associated with a second stiffness in the vehicle longitudinal direction and arranged inboard of the first zone,
  wherein the first zone and the second zone are arranged laterally in a vehicle widthwise direction,
  wherein the second stiffness of the second zone is greater than the first stiffness of the first zone;
  an accelerometer receiving one or more signals associated with an impact on the vehicle; and
  an electronic control unit (ECU) deploying the airbag based on an amplitude or a wavelength of one or more of the signals compared to an amplitude threshold or a wavelength threshold associated with the first stiffness of the first zone and the second stiffness of the second zone.

* * * * *

UNITED STATES PATENT AND TRADEMARK OFFICE
CERTIFICATE OF CORRECTION

PATENT NO. : 10,328,879 B2
APPLICATION NO. : 15/638681
DATED : June 25, 2019
INVENTOR(S) : Siyang Yang et al.

Page 1 of 1

It is certified that error appears in the above-identified patent and that said Letters Patent is hereby corrected as shown below:

On the Title Page

In [54] replace "BEAN" with "BEAM"

Signed and Sealed this
Seventeenth Day of September, 2019

Andrei Iancu
*Director of the United States Patent and Trademark Office*